United States Patent [19]
Sampsell

[11] Patent Number: 6,052,556
[45] Date of Patent: *Apr. 18, 2000

[54] INTERACTIVITY ENHANCEMENT APPARATUS FOR CONSUMER ELECTRONICS PRODUCTS

[75] Inventor: Jeffrey B. Sampsell, Vancouver, Wash.

[73] Assignee: Sharp Laboratories of America, Camas, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/720,115

[22] Filed: Sep. 27, 1996

[51] Int. Cl.$^7$ ..................................................... H04N 7/173
[52] U.S. Cl. ............................. 455/6.2; 455/5.1; 348/10; 348/12
[58] Field of Search .................................. 348/12, 13, 7, 348/6; 455/5.1, 6.1, 4.2, 3.1, 6.2, 6.3; 386/83, 46; H04N 7/16, 7/173

[56] References Cited

U.S. PATENT DOCUMENTS

| | | |
|---|---|---|
| 4,807,031 | 2/1989 | Broughton et al. . |
| 5,005,013 | 4/1991 | Tsukamoto et al. ............... 340/825.44 |
| 5,113,259 | 5/1992 | Romesburg et al. .................... 348/589 |
| 5,273,437 | 12/1993 | Caldwell et al. ......................... 434/351 |
| 5,347,304 | 9/1994 | Moura et al. . |
| 5,404,160 | 4/1995 | Schober et al. . |
| 5,489,894 | 2/1996 | Murray .............................. 340/825.44 |
| 5,546,193 | 8/1996 | Hailey et al. .............................. 386/83 |
| 5,557,675 | 9/1996 | Schupak . |
| 5,594,492 | 1/1997 | O'Callaghan et al. .................... 348/10 |
| 5,603,077 | 2/1997 | Muckle et al. ............................ 455/3.2 |
| 5,623,256 | 4/1997 | Marcoux ............................ 340/825.69 |
| 5,812,931 | 9/1998 | Yuen ....................................... 348/12 |
| 5,861,804 | 1/1999 | Fansa et al. ............................ 340/539 |
| 5,877,699 | 3/1999 | Sharpe et al. ...................... 340/825.44 |

FOREIGN PATENT DOCUMENTS

| | | |
|---|---|---|
| WO 94/14282 | 6/1994 | European Pat. Off. . |
| WO 96/22633 | 7/1996 | European Pat. Off. . |

Primary Examiner—Chris Grant
Attorney, Agent, or Firm—Julie L. Reed

[57] ABSTRACT

Apparatus for enhancing the interactivity of a consumer electronic product in the home. The invented apparatus includes an electronic product typically located in a user's home, e.g. a television (TV), equipped with an input/output (I/O) port that permits an external device to be operatively connected thereto for interacting with the TV, wherein the external device receives and optionally transmits user information over an existing paging network. The external device may itself be a pager, or it may be any device capable of receiving useful user information from a remote source and formatting it for porting to a memory buffer within the home electronic product via the I/O port. In response to receipt of such information and an appropriate command, the electronic product such as a TV may display the information in a window created within the TV screen or may overlay the information in such manner that it is visible to the TV viewer without interrupting regular broadcast or cable TV reception. Information received from the remote source may include weather warnings, sports scores, stock exchanges, news reports or other information. Preferably, the electronic product is a TV, the embedded microprocessor and memory of which are programmed with a soft ICAP emulator that establishes a handshake and protocol with the I/O port and is responsive to data and commands that are received thereat from an external device. Preferably also, the external device includes a programmed microcontroller or processor emulating the ICAP protocol and capable of receiving information from a remote source such as the paging network, establishing a handshake with the TV's emulator software, conveying data into the TV's memory and issuing display or other commands to the TV based in part upon user inputs or programmed preferences, etc.

17 Claims, 2 Drawing Sheets

INTERACTIVITY ENHANCEMENT APPARATUS FOR CONSUMER ELECTRONICS PRODUCTS

TECHNICAL FIELD

The present invention relates generally to consumer electronics. More specifically, it concerns an enhancement module connected to a consumer electronics product, e.g. a television (TV), videocassette player or recorder (VCR), cable converter box or personal computer (PC), that provides a standard peripheral port and protocol by which external electronic devices, e.g. pagers, printers, messaging input or output devices, may be operatively connected to permit the product and the device to enhance the user's entertainment value.

BACKGROUND ART

Most consumer electronics products such as those found in the home feature central processing units (CPUs) typically including a microprocessor data/address bus-connected to read-only memory (ROM), read-and-write memory (RAM) and other associated circuitry that is customized to perform a particular function, e.g. digital signal processing in a TV's closed-caption decoder. The data/address bus is internal to the consumer electronic product, and effectively is thereby rendered special-purpose and of no general-purpose processing capability. Various prior art techniques have been proposed to enhance the interactivity of TV's, for example, and to provide a useful interconnection between two or more consumer electronic products such as a TV and an entertainment or education device or a central computer.

Some such proposed interactivity enhancements are described in U.S. Pat. No. 4,807,031, issued Feb. 21, 1989 and entitled Interactive Video Method and Apparatus. Another such proposed enhancement is described in U.S. Pat. No. 5,404,160 issued Apr. 4, 1995 and entitled System and Method for Identifying a Television Program. The former teaches an external electro-optic or RF transducer for receiving modulated luminance-encoded data that has been invisibly added to the visible normal television signal prior to broadcast, for the remote control of entertainment devices operatively connected to the transducer and associated decoding circuitry. The latter teaches an RF transducer and associated decoder circuitry for recording the television broadcast and using such recorded frames to verify viewership and to communicate such confirmation to a remote central host computer or verification service.

U.S. Pat. No. 5,347,304 entitled Remote Link Adapter for Use in TV Broadcast Data Transmission System teaches a hybrid system for transmitting and receiving high-speed digital information via a vestigial sideband video modulator at a central broadcast site and a receiver at a remote TV site, where the data may be used by data terminal equipment (DTE) or a computer such as a PC.

None of the prior art suggests providing a consumer electronics product such as a television with a hardware port into the product's CPU or a standard hardware and software communication protocol therefor for connection therewith of a variety of external consumer electronics devices via a messaging service such as the existing paging network.

DISCLOSURE OF THE INVENTION

Briefly summarized, the invented apparatus includes an electronic product typically located in a user's home, e.g. a TV, equipped with an I/O port that permits an external device to be operatively connected thereto for interacting with the TV, wherein the external device receives and optionally transmits user information over an existing paging network or generates the data internally. The external device may include a pager or may be a pager, or it may be any device capable of receiving useful user information from a remote source and formatting it for porting to a memory buffer within the home electronic product via the I/O port. In response to receipt of such information and an appropriate command, the electronic product such as a TV may display the information in a window created within the TV screen or may overlay the information in such manner that it is visible to the TV viewer without interrupting regular broadcast or cable TV reception. The window on the TV screen may, of course, be the entire display screen, thus turning the TV into a monitor of the information being received from the remote source such as a channel conveying weather warnings, sports scores, stock exchanges, news reports, or other information.

Preferably, the electronic product is a TV the microprocessor and memory of which are programmed with a soft ICAP emulator that establishes a handshake and protocol with the I/O port and is responsive to data and commands that are received thereat from an external device. Preferably also, the external device includes a programmed microcontroller or processor emulating the ICAP protocol and capable of receiving information from a remote source such as the paging network, establishing a handshake with the TV's emulator software, conveying data into the TV's memory and issuing display or other commands to the TV based in part upon user inputs or programmed preferences, etc.

These and additional objects and advantages of the present invention will be more readily understood after consideration of the drawings and the detailed description of the preferred embodiment which follows.

DETAILED DESCRIPTION OF THE PREFERRED EMBODIMENT

AND BEST MODE OF CARRYING OUT THE INVENTION

Figure 1A:
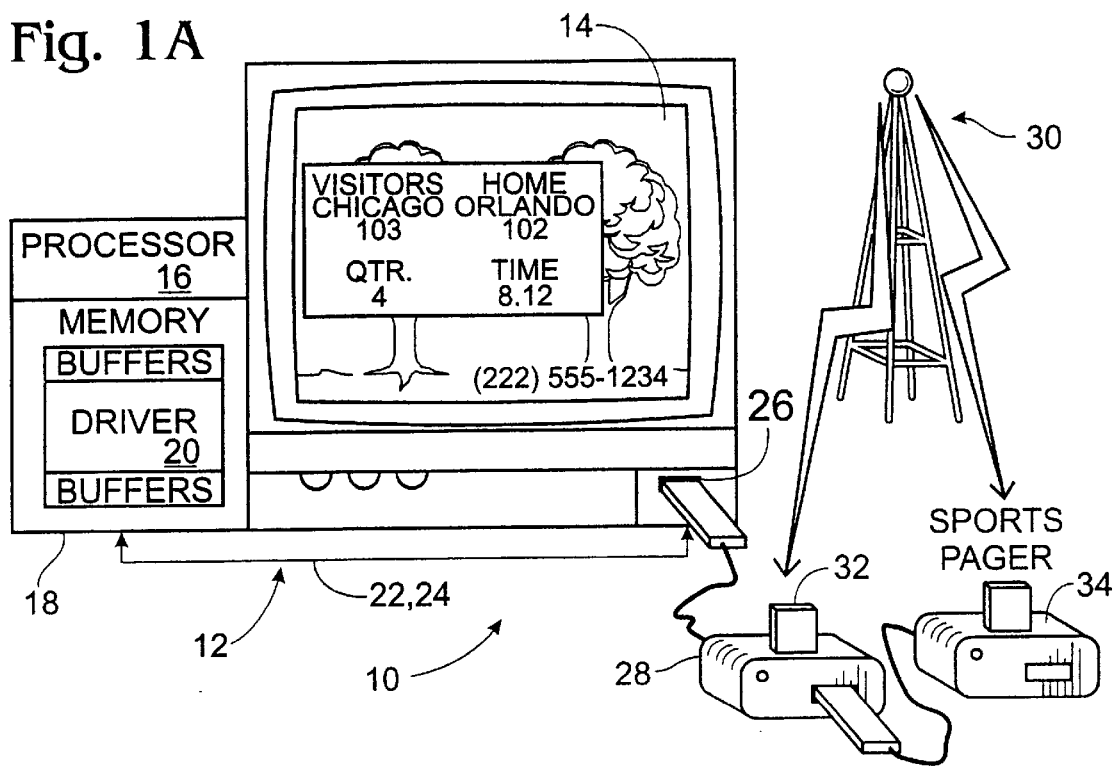
FIGS. 1A through 1E are system block diagrams showing the apparatus made in accordance with five alternative embodiments for use in connection with a TV and a portable pager.

Referring first to FIG. 1A, it will be understood that an invented electronics system indicated generally at 10 preferably includes an electronic product 12 including an operatively connected display screen 14 and a digital processor 16 and a memory device 18 for storage of a software driver or engine 20, processor 16 providing a data and an address bus, 22, 24, respectively, operatively connected with an input and/or output (I/O) port 26. I/O port 26 preferably is accessible from an exterior of product 12, with driver 20 causing processor 16 to communicate with product 12 and an external device 28 operatively connected to I/O port 26. Driver 20 will be understood to enable such an external device to convey information from such device to display screen 14 for viewing thereon of such information supplied by such device. It may be seen from FIG. 1A that external device 28 is operatively connectable to I/O port 26 for communicating such information to product 12 in accordance with a defined protocol, with external device 28 being operatively linked to a remote messaging service network 30.

One exemplary product 12 is a TV, as indicated in FIGS. 1A through 1E. Alternatively, product 12 might be a videocassette player or VCR. Also preferably, remote messaging service network 30 is a paging network, as indicated schematically by the antenna and radio signal illustrated in FIG. 1A. It may be seen from FIG. 1A that external device 28 preferably includes a messaging pager 32 operatively connectable to such paging network 30. I/O port 26 preferably includes an electromechanical docking structure that is plug-compatible with external device 28, as is represented in FIG. 1A by messaging pager 32 operatively connected therewith, with receiver 28 connected in turn with I/O port 26 of TV 12, which it will be appreciated need not be physically part of the TV housing but may instead be part of a docking station connected thereto. It will also be appreciated from FIG. 1A that plural external, peripheral devices may be daisy-chained by using the PCMCIA channel, as illustrated with a second "SPORTS PAGER"/receiver 34 also connected, indirectly, but operatively and ultimately to TV 12. Alternatively, I/O port 26 may include a wireless communication link to the external device, e.g. an infrared wireless communication subsystem may be used that is similar to the remote control devices conventionally used to control TVs.

Those skilled in the art will understand the invention to be described as a communications system that includes an in-home consumer electronics product 12 including a storage buffer within memory device 18, a display or display screen 14, a controller or processor 16 and an input and/or output (I/O) port 26. The communications system may be seen further to include a messaging system or network 30 providing at least one-way (and, as will be seen, optionally two-way) wireless communication to a user from a messaging service provider. The communications system also preferably includes a wireless receiver or external device 28 operatively connectable to said messaging system, e.g. via embedded messaging pager 32, for receiving and storing a message from such a messaging service provider, with receiver 28 further being operatively connectable to I/O port 26 of product 12. Skilled persons will appreciate that, when receiver 28 is operatively connected to product 12—whether by physical porting as illustrated or via a wireless communication link—it is made to upload a received-and-stored message to the storage buffer for display of the message on the display responsive to the controller, which is suitably programmed to implement a predefined communications protocol as by use of driver 20 described above.

Those of skill will appreciate that I/O port 26 may be implemented in any number of ways, all within the spirit and scope of the invention. For example, it may be implemented as a PCMCIA card slot/connector positioned on the exterior housing of consumer electronics product 12. The PCMCIA channel is preferred because it can be made to pass the embedded processor's data and address busses (appropriately buffered) to an external device connectable with I/O port 26. The PCMCIA format is preferred because of its widespread application, ease of use and potential for excellent electromagnetic interference (EMI) shielding.

Alternative busses may of course be used, including for example the IEEE 1394 or IEEE 488 bus, which are more expensive to support but also provide more capability including higher bandwidth. If a less expensive solution is desired, a lower cost and lesser capable bus such as a bit-serial bus may be used, e.g. the uniform serial bus (USB) or consumer electronics bus (CEBUS), with device data and command streams being somewhat more complicated by the bit-serial nature of the communication. If a wireless bus is desired, as described herein an RF or IR link may be made between the consumer electronics product and the external device using a protocol like IRDA2.

Turning now briefly to FIGS. 1B through 1E, alternative embodiments of the invention may be understood to be within the spirit and scope of the invention. The apparatus shown in FIG. 1B will be understood to be similar to that shown in FIG. 1A, except that the messaging system is not shown and a second pager, e.g. a sports pager corresponding with that shown in FIG. 1A is directly connected, e.g. via a PCMCIA card, to receiver or docking station 28 in which message pager 32 is docked. Docking station 28 may be seen to be operatively connected with I/O port 26 of TV 12, as described above by reference to FIG. 1A.

Figure 1B:
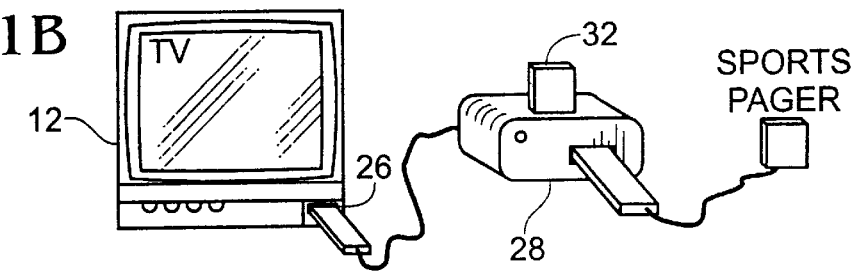
Figure 1C:
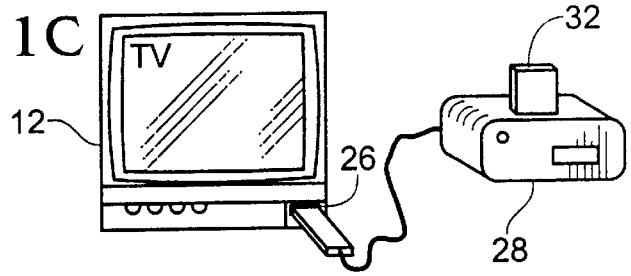
Figure 1D:
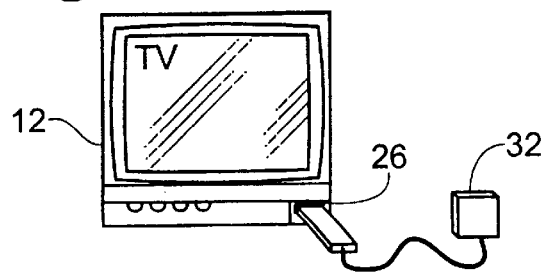
Figure 1E:
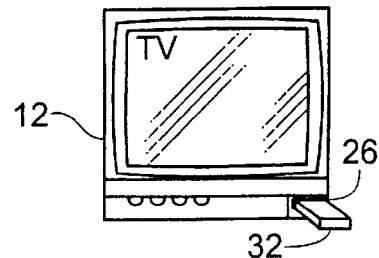

FIG. 1C is similar to FIG. 1B, but provides only a primary, messaging pager 32 and no secondary, e.g. sports, pager. FIG. 1D is similar to FIG. 1C, but shows messaging pager 32 directly connected, e.g. via a PCMCIA card, to I/O port 26 of TV 12. Finally, FIG. 1E is similar to FIG. 1D, but shows messaging pager 32 physically docked in I/O port 26 of TV 12, without utilizing a PCMCIA card or other intermediate connection. Those of skill in the art will appreciate that any and all such alternative embodiments of the apparatus, whether described and illustrated herein or not—including one providing a wireless IR, RF or other operative connection between an external device and a consumer electronics product—are contemplated, and are within the spirit and scope of the invention.

It is appreciated now the versatility of the invented system. Enhanced interactivity within the consumer's home is made possible with the proposed system whereby multiple peripherals may be connected via a standard I/O port with the processor embedded within a consumer electronics product such as a TV or PC. The software engine, to be described in some detail immediately below, implements a command protocol that is easily utilized by connected peripheral devices to communicate data between the peripheral device and the consumer product. Moreover, the established protocol increases the connectivity of the consumer product by providing a standard logical and physical interface to which third-party hardware and software suppliers may design further peripheral devices and functions. The software engine also provides a built-in capability to manage many display functions as well as interactivity with a user of the consumer electronics product, e.g. via a remote control similar to those used presently to control TVs.

A most important feature of the invented system is the use of existing messaging services and paging networks to supply information to a pager embedded within a peripheral device, whereby the embedded pager receives messages therefrom such as weather warnings, sports scores, stock exchanges, news reports or other information and is then enabled—by docking the wireless receiver with the I/O port of the consumer electronics product—to view, scroll, select, print or otherwise interact with the message. It will be appreciated that the message type may be anything including text, graphics, etc. that is providable by existing or future messaging services.

The organization of the driver next will be briefly described, implementation of which is straightforwardly accomplished by the use of the Wink Engine and its tool kit by those skilled in the art. First, it is appreciated that the invented communication software module is a program written specially for the invented system, and it is designed to manage all layers, e.g. application layer, session layer, data link layer and physical layer, of communication between the consumer electronics product's embedded processor and the external device. In accordance with the preferred embodiment of the invention, the Wink Engine, a software module available from Wink Communication, Inc., is used. The Wink Engine includes libraries that interpret a wide array of display and interactivity commands sent to the processor from the external devices as ICAP protocols. The protocols are converted into assembly language instructions to allow interactivity between the user and the external device. Alternatively, another software system could be created to interface between the peripherals, the embedded processor and the consumer electronics product functionalities. The Wink Engine is preferred because it is easy to use and provides useful development tools.

Those of skill in the art will appreciate that driver 20, which may be customized version of the Wink Engine, along with other associated software or firmware, resides in memory 18, and that cooperative software that communicates commands and data thereto resides within memory provided within one or more receivers such as receivers 28, 34. Processor 16 within consumer electronics product 12, as well as a processor residing within one or more receivers such as receivers 28, 34, will be understood to execute the firmware or software residing in memory, thereby to implement the desired communication and presentation protocols.

Countless external devices are envisioned for use in the invented system. A wireless pager is the easiest to illustrate, as shown in FIGS. 1A through 1E, and it will be appreciated that also within the spirit and scope of the invention a dedicated pager function could be provided within the consumer electronics product, thereby obviating the product's I/O port and the portable pager's display, power supply and controls. The pager functions in a normal fashion when carried with the user in a mobile scenario. Upon returning to a home or office where the system is available in the form of a TV or PC or VCR, for example, the user plugs the pager directly into the PCMCIA I/O port on the housing of the consumer electronics product or into a docking station connected thereto. Now when pages are received they can be viewed on the TV or PC monitor, overlaid upon existing programming or use. Audio or video alerts may be provided by the interactivity controller that is part of the software that resides within the memory of the TV, VCR, cable converter box or PC. Menus may be selected to review, manage and delete older messages, etc.

Dedicated application messaging pagers, e.g. sports pagers, can deliver real-time updates of sports scores and volumes of other sports statistics that may be viewed at user discretion in either their most abbreviated overlay form or in full-screen database retrieval form. This service would be available on all channels, unlike current sports updates, which may be viewed only on their "resident" channel. In other words, as an overlay, the message may be viewed at will regardless of the channel that is selected for viewing on the TV monitor. In this important way, normal TV viewing or PC use, for example, is augmented rather than interrupted with the optional messaging services and functions.

Another exemplary external device provides an electronic program guide (EPG) obtained over wireless channels, as with the described pager, or over phone lines connected to the external device. Unlike current wireless EPGs, which require a dedicated channel for viewing, the guide or portions thereof may be viewed in overlay on top of whatever program material is currently being viewed on the TV or on top of whatever application is currently being used on the PC, as illustrated in FIG. 1A at 14. Thus, in accordance with a preferred embodiment of the invention, a message is displayed responsive to controller or processor 16 on display 14 in the form of a second image overlaying a first image being displayed thereon.

Rudimentary viewing and selecting options may be provided. For example, an implementation of the software engine might implement only full-page displays and bottom-of-screen update displays. Importantly, more elaborate options may be provided by uploading into the memory of the consumer electronics product via the connected device function enhancement software that is developed by third-party hardware and/or software suppliers. In this way, the installed base will support the most basic capabilities, but will do so in a way that encourages third-party developers to provide the consumer with enhanced feature and function sets.

This writable-control-store architecture preferably is part of the invented software engine, whereby the controller effectively can be trained to particular applications by a software upload that occurs through the provided I/O port. For PCs, a base software capability and a driver that emulates the Wink Engine may be loaded into the PC from a flex drive or CD-ROM disc so that external devices remain portable among entertainment platforms like a TV and computing platforms like a PC. Thus, it is preferable that in-home consumer electronics product 12 include such a writable control store (which may be a region of memory 18) and that a receiver such as receiver 28 operatively connected to product 12 upload to such a writable control store data enabling defined interaction between the in-home consumer electronics product and the receiver.

Product 12 may communicate with receiver 28 or 34 via a variety of communication protocols known to those skilled in the art including but not limited to Kermit, HDLC, IEEE 1394, I$^2$C and PCMCLA. Product 12 preferably contains separate communication's protocol stack variables and buffers for each connected device. The protocol stacks preferably share a common physical layer, and have separate data link and session layers. The physical layer arbitrates communication with the connected products, thereby ensuring that no two devices transmit simultaneously. This may be performed through dedicated, daisy-chained bus request and grant signals, open-collector or open-drain signaling or other methods known to those skilled in the art. The physical layer transmits data from the appropriate data link layer transmit buffer and routes the received data to the appropriate data link layer receive buffer.

The software engine, or driver 20, within product 12 contains a separate set of data link layer variables and buffers for each connected device. This allows the devices to operate independently. The data link layer establishes communication with a connected device through hand-shaking protocols such as HDLC's Set Asynchronous Balanced Mode (SABM) and Un-numbered Acknowledge (UA) communication link establishment sequence. Once the link has been established, data can be exchanged between product 12 and the connected device such as receiver 28 or 34. Exchanged data is verified using a cyclic redundancy check (CRC), package sequence numbers, packet acknowledgments and packet re-transmissions or re-sends. Forward error correction may also be used. These processes are all performed, in accordance with the preferred embodiment of the invention, by the data link layer.

The session layer communicates between the product's application and the protocol stack. The session layer is used to request the protocol stack to establish and release a link transmit data and check for received data.

Figure 2A:
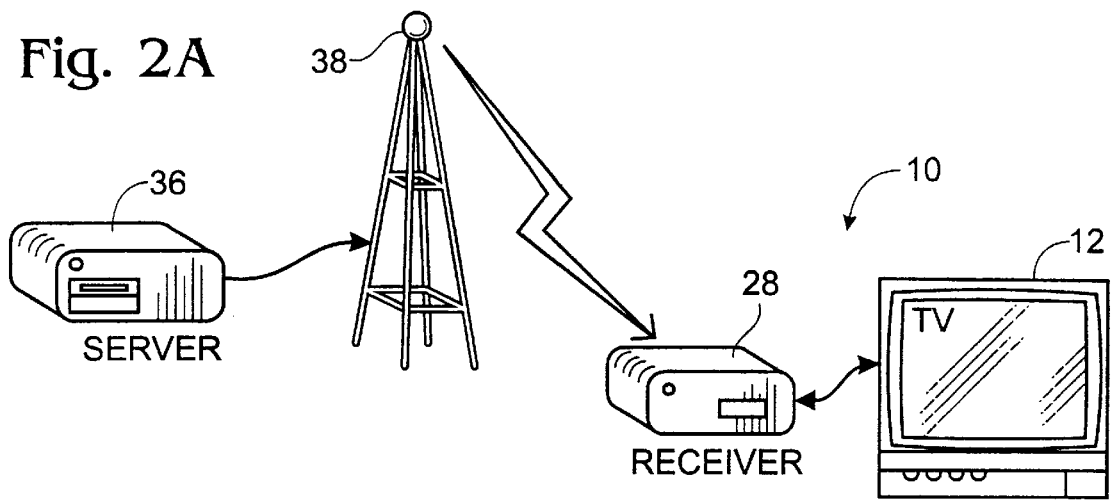
FIGS. 2A through 2C are block diagrams of three alternative embodiments of the communication system of which the invented apparatus forms a part.
Figure 2B:
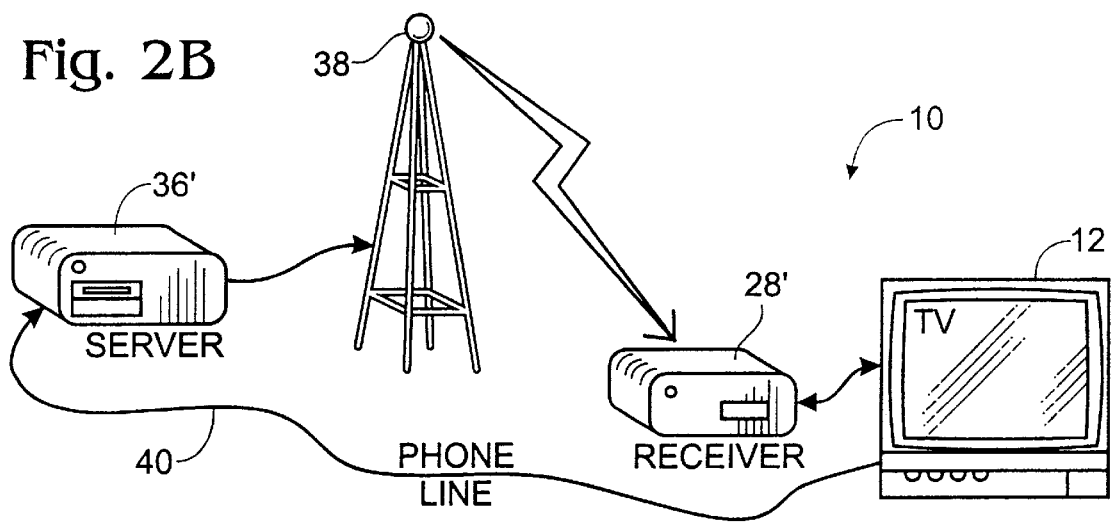
Figure 2C:
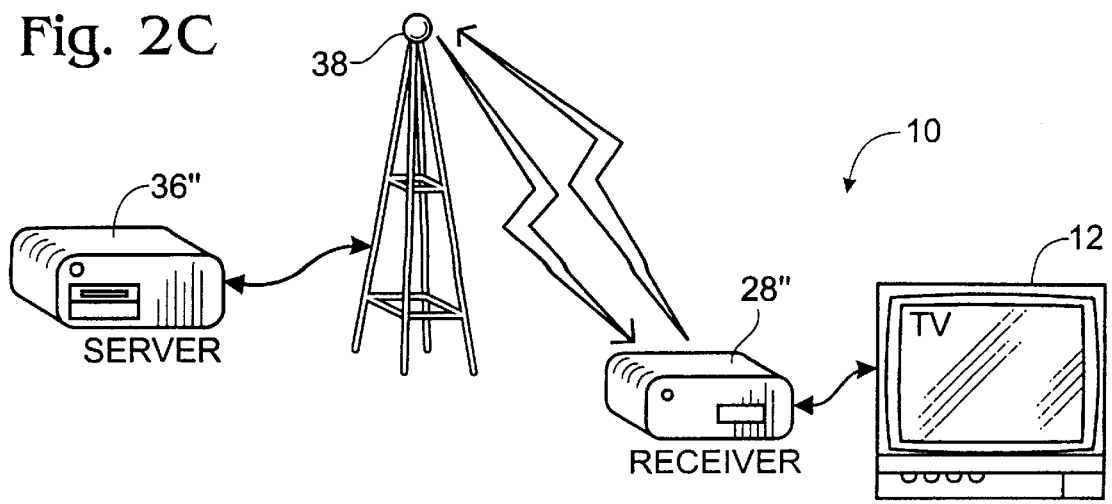

Referring briefly and collectively to FIGS. 2A through 2C, those skilled in the communications art will appreciate that a number of alternative communication systems and schemes are envisioned for use with apparatus 10. FIG. 2A shows a one-way communication system including a messaging server, or service provider, 36 operatively connected with an antenna 38 communicating data to a remote receiver 28 connected, for example, with a TV 12 in a viewer's home. It will be appreciated that server 36 and antenna 38 in FIGS. 2A through 2C collectively correspond with messaging system or network 30 of FIGS. 1A through 1D.

FIG. 2B shows an asymmetric communication system that is similar to that of FIG. 2A but that provides return messaging from the remote viewer location back to server 36' via a telephone line 40 and modems (not shown) connected therewith. Finally, FIG. 2C shows a symmetric communication system that is similar to that of FIG. 2B but that provides return messaging instead via the paging network, whereby remote receiver 28" is equipped also with a transmitter and wherein server 36" is capable of two-way signaling with antenna 38. Those skilled in the art will appreciate that any and all such communication systems or schemes are contemplated, and are within the spirit and scope of the invention.

Accordingly, while the present invention has been shown and described with reference to the foregoing preferred method and apparatus, it will be apparent to those skilled in the art that other changes in form and detail may be made therein without departing from the spirit and scope of the invention as defined in the appended claims.

I claim:

1. An electronics system comprising:

an electronics product including an operatively connected display screen and a digital processor and a memory device for storage of a software driver, said processor providing a data and an address bus operatively connected with a bi-directional input and/or output (I/O) port accessible from an exterior of said product, said driver causing said processor to communicate with said product and an external device operatively connected to said I/O port, said driver enabling such an external device to convey information from such external device to said display screen for viewing thereon of such information supplied by such external device, wherein said information is conveyed as an overlay to any other information displayed on said display screen; and an external device operatively connectable to said I/O port for communicating such information to said product in accordance with a defined protocol, said external device being operatively linked to a remote messaging network which provides said information to be communicated.

2. The system of claim 1, wherein said product is a television set.

3. The system of claim 1, wherein said product is a videocassette player.

4. The system of claim 1, wherein said product is a videocassette recorder.

5. The system of claim 1, wherein said remote messaging service network is a paging network.

6. The system of claim 5, wherein said external device includes a pager operatively connectable to said paging network.

7. The system of claim 1, wherein said I/O port includes an electro-mechanical docking structure that is plug compatible with said external device, operable to provide two-way communication.

8. The system of claim 1, wherein said I/O port includes a wireless communication link to said external device.

9. The system of claim 8, wherein said wireless communication link is electro-optical.

10. The system of claim 9, wherein said wireless communication link utilizes infrared light.

11. The system of claim 1, wherein said data contains commands for interpreting data and data to be interpreted.

12. The system of claim 1, wherein said data contains commands for interpreting code and code to be executed by said in-home electronics product.

13. A communications system comprising:

an in-home consumer electronics product including a storage buffer, a display, a controller and an input and/or output I/O port;

a first electronic device operatively connectable to said I/O port of said in-home consumer electronics product; and at least one additional external device in communication with said first electronic device, wherein said first electronic device establishes communication and exchanges data with said at least one additional external device and provides information derived from said data to a user, thereby enabling the user to respond to said information, and conveys any such response as data back to said at least one additional external device collocated in a structure with said first electronic device.

14. The system of claim 13, wherein said consumer electronics product is a television.

15. The system of claim 13, wherein said consumer electronics product is a personal computer.

16. The system of claim 13, wherein said data contains commands for interpreting data and data to be interpreted.

17. The system of claim 13, wherein said data contains commands for interpreting code and code to be executed by said in-home electronics product.

* * * * *